US008369036B2

(12) United States Patent
Ouchi

(10) Patent No.: US 8,369,036 B2
(45) Date of Patent: Feb. 5, 2013

(54) LENS APPARATUS

(75) Inventor: Syunichiro Ouchi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 253 days.

(21) Appl. No.: 12/956,240

(22) Filed: Nov. 30, 2010

(65) Prior Publication Data

US 2011/0128641 A1   Jun. 2, 2011

(30) Foreign Application Priority Data

Nov. 30, 2009   (JP) .................................. 2009-272289

(51) Int. Cl.
 *G02B 7/02* (2006.01)
(52) U.S. Cl. .......................... 359/823; 359/822; 359/824
(58) Field of Classification Search .................. 359/694, 359/696, 698, 822–824
 See application file for complete search history.

(56) References Cited

U.S. PATENT DOCUMENTS

| 7,544,004 B2 | 6/2009 | Kawai et al. |
| 2006/0204234 A1 | 9/2006 | Kawai et al. |

FOREIGN PATENT DOCUMENTS

| JP | 2006-227170 | 8/2006 |
| JP | 2007-102106 | 4/2007 |
| JP | 2008-209647 | 9/2008 |

*Primary Examiner* — Ricky Mack
*Assistant Examiner* — Mahidere Sahle
(74) *Attorney, Agent, or Firm* — Young & Thompson

(57) ABSTRACT

A lens apparatus is capable of adjusting only the inclination of an optical axis in a desired direction. A focus lens frame is movably supported by a first guide shaft and a second guide shaft. The first guide shaft is provided in a lens barrel with both end parts of the first guide shaft being fixed. A front end part of the second guide shaft is swingably supported, a rear end part thereof is fitted into a horizontal elongate hole, and the second guide shaft is movably supported only in a horizontal direction. The second guide shaft is inserted through a first elongate hole formed in a swinging frame, and when the swinging frame is swung, the second guide shaft is horizontally swung. Then, when the second guide shaft is horizontally swung, the focus lens frame is horizontally swung, whereby the horizontal inclination of the optical axis is adjusted.

12 Claims, 12 Drawing Sheets

LENS APPARATUS

BACKGROUND OF THE INVENTION

1. Field of the Invention

The present invention relates to a lens apparatus, and more particularly, to a lens apparatus having a function of adjusting an optical axis.

2. Description of the Related Art

There has been known a lens apparatus which uses a linear actuator such as a voice coil motor (VCM) to drive a movable lens such as a focus lens and a zoom lens (for example, Japanese Patent Application Laid-Open No. 2007-102106).

In the lens apparatus which uses the linear actuator to drive the lens as described above, generally, a lens frame is slidably supported by a guide shaft provided parallel to an optical axis, and the lens is movably supported. Accordingly, if the guide shaft is not accurately incorporated, the optical axis of the lens is inclined, and desired optical performance cannot be obtained.

In view of the above, there have been proposed various lens apparatuses capable of adjusting the inclination of the optical axis by adjusting the inclination of the guide shaft.

For example, Japanese Patent Application Laid-Open No. 2008-209647 proposes a configuration in which an eccentric cam part is formed in a guide shaft, and the eccentric cam part is inserted through a lens frame. According to this configuration, when the guide shaft is rotated, the eccentric cam part is eccentrically rotated. As a result, the lens frame through which the eccentric cam part is inserted moves in a direction orthogonal to an optical axis, so that the deviation of the optical axis is adjusted.

In addition, Japanese Patent Application Laid-Open No. 2006-227170 proposes a configuration in which one end of a guide shaft is fixed to a lens barrel, and another end thereof is eccentrically supported by a bearing member which is rotatably provided to the lens barrel. According to this configuration, when the bearing member is rotated, the another end of the guide shaft which is supported by the bearing member is eccentrically rotated. As a result, the guide shaft is swung so as to form a circular arc, so that the inclination of an optical axis is adjusted.

SUMMARY OF THE INVENTION

Meanwhile, the lens apparatus including a movable lens generally includes a sensor for detecting a position of the movable lens. An example of such a sensor is an MR sensor (magnetic resistance sensor). Generally, the MR sensor includes a sensor main body which is placed in a lens barrel, and a magnet for position detection which is placed in the lens. At the time of the placement, it is necessary to place the sensor main body and the magnet so as to be opposed to each other and to place the two so that an interval (air gap) therebetween falls within a given range.

In the lens apparatus which uses the MR sensor as described above, when the optical axis of a lens is adjusted according to the configuration of each of Japanese Patent Application Laid-Open Nos. 2008-209647 and 2006-227170, random move is caused in a direction orthogonal to the optical axis (X direction, Y direction, and X-Y combination direction). Therefore, the interval of the air gap between the sensor main body placed in the lens barrel and the magnet placed in the lens changes, which leads to a disadvantage that detection accuracy of a position of the lens is deteriorated or lost.

The present invention has been made in view of such circumstances, and therefore has an object to provide a lens apparatus capable of adjusting only the inclination of an optical axis in a desired direction.

In order to achieve the above-mentioned object, a first aspect of the present invention provides a lens apparatus including: a lens barrel; a first guide shaft which is provided parallel to an optical axis in the lens barrel; a second guide shaft which is provided parallel to the optical axis in the lens barrel; a first guide shaft front end fixing part which is provided to the lens barrel and to which a front end of the first guide shaft is fixed; a first guide shaft rear end fixing part which is provided to the lens barrel and to which a rear end of the first guide shaft is fixed; a second guide shaft front end supporting part which is provided to the lens barrel and swingably supports a front end of the second guide shaft; a second guide shaft rear end supporting part which is provided to the lens barrel as one of a horizontal elongate hole and a vertical elongate hole and into which a rear end of the second guide shaft is fitted to be supported movably only in one of a horizontal direction and a vertical direction; a lens frame which holds a lens; a first guide part which is provided to the lens frame and is engaged with the first guide shaft to thereby guide a move of the lens frame; a second guide part which is provided to the lens frame and is engaged with the second guide shaft to thereby guide the move of the lens frame; a swinging member which is provided to the lens barrel swingably with respect to a swinging shaft which is parallel to the optical axis; a first elongate hole which is formed in the swinging member and through which the second guide shaft is inserted; a rotating member which is provided to the lens barrel rotatably with respect to a rotating shaft which is parallel to the optical axis; an eccentric pin which is provided to the rotating member parallel to the optical axis and is provided eccentrically with respect to the rotating shaft; a second elongate hole which is formed in the swinging member and through which the eccentric pin is inserted; and a linear actuator which moves the lens frame, in which the second guide shaft is swung one of horizontally and vertically by rotating the rotating member, to thereby enable adjusting one of horizontal inclination and vertical inclination of the optical axis of the lens.

According to the present invention, the lens frame is guided by the first guide shaft and the second guide shaft, so that the lens is supported movably along the optical axis. The first guide shaft which guides the lens frame has: the front end which is fixed to the first guide shaft front end fixing part provided to the lens barrel; and the rear end which is fixed to the first guide shaft rear end fixing part provided to the lens barrel. On the other hand, the second guide shaft has: the front end which is swingably supported by the second guide shaft front end supporting part provided to the lens barrel; and the rear end which is fitted into the second guide shaft rear end supporting part which is formed in a lens barrel main body as the horizontal elongate hole (or the vertical elongate hole), to be supported movably only in the horizontal direction (or the vertical direction). As a result, when the rear end of the second guide shaft is horizontally (or vertically) moved, the second guide shaft is swung in the horizontal direction (or the vertical direction) with a supported part of the front end thereof by the second guide shaft front end supporting part being as a fulcrum. Accordingly, when the rear end of the second guide shaft is horizontally (or vertically) moved, it is possible to adjust the horizontal (or vertical) inclination of the optical axis of the lens. Here, the second guide shaft is inserted through the first elongate hole of the swinging member which is swingably provided to the lens barrel. The second elongate hole is further formed in the swinging member, and the eccentric pin of the rotating member which is rotatably provided to the lens barrel is inserted through the second elongate hole. When the rotating member is rotated, the swinging member is swung by an action between the second elongate hole and the eccentric pin, with respect to the swinging shaft provided parallel to the optical axis. Then, when the swinging member is swung with respect to the swinging shaft, the rear end of the second guide shaft is horizontally (or vertically) moved by an action between the first elongate hole and the second guide shaft within the second guide shaft rear end supporting part. In this way, according to the present invention, when the rotating member is rotated, the rear end of the second guide shaft can be horizontally (or vertically) moved. Further, when the rear end of the second guide shaft is horizontally (or vertically) moved, the second guide shaft can be swung only in the horizontal direction (or the vertical direction), and this makes it possible to adjust only the horizontal inclination of the optical axis without swinging in the vertical direction (in the case where the second guide shaft is swung in the vertical direction, it is possible to adjust only the vertical inclination of the optical axis without swinging in the horizontal direction).

In order to achieve the above-mentioned object, a second aspect of the present invention provides the lens apparatus according to the first aspect, further comprising an MR sensor which is provided to the lens barrel and detects a position of the lens, wherein the MR sensor includes: an MR sensor main body which is attached to the lens barrel so as to be parallel to the second guide shaft rear end supporting part; and a position detection magnet which is attached to the second guide part so as to be opposed to the MR sensor main body.

According to the present invention, the second guide shaft is swung only in the horizontal direction (or the vertical direction), to thereby adjust the inclination of the optical axis, and hence even when the inclination of the optical axis is adjusted, the interval of the air gap between the MR sensor main body provided to the lens barrel and the position detection magnet provided to the second guide part does not fluctuate. With this configuration, it is possible to facilitate the assembly and to stably detect the position of the lens. It should be noted that the MR sensor main body and the position detection magnet are horizontally provided in the case where the second guide shaft rear end supporting part is formed as the horizontal elongate hole, and are vertically provided in the case where the second guide shaft rear end supporting part is formed as the vertical elongate hole. That is, the MR sensor main body and the position detection magnet are placed parallel to a plane along which the second guide shaft is swung.

In order to achieve the above-mentioned object, a third aspect of the present invention provides the lens apparatus according to the first or second aspect, further comprising an image pickup element which is horizontally attached to a rear end part of the lens barrel and has an aspect ratio of 16:9, wherein the second guide shaft rear end supporting part is provided to the lens barrel as the horizontal elongate hole and supports the rear end of the second guide shaft movably only in the horizontal direction.

According to the present invention, the image pickup element having the aspect ratio of 16:9 is horizontally attached to the rear end part of the lens barrel. In the case of the horizontally long image pickup element as described above, even if the optical axis is slightly inclined in the vertical direction, an influence of the inclination on the quality of a video picture is small. Accordingly, the present invention is particularly effective for the lens apparatus in which the horizontally long image pickup element as described above is incorporated.

In order to achieve the above-mentioned object, a fourth aspect of the present invention provides the lens apparatus according to any one of the first to third aspects, in which: the swinging shaft, the first elongate hole, and the second elongate hole are located on the same straight line in the swinging member, and the first elongate hole is located between the swinging shaft and the second elongate hole; and the swinging member is attached to the lens barrel so that the second elongate hole intersects with the second guide shaft rear end supporting part.

According to the present invention, the swinging shaft, the first elongate hole, and the second elongate hole are located on the same straight line in the swinging member, and the first elongate hole is located between the swinging shaft and the second elongate hole. Further, the swinging member is attached to the lens barrel so that the second elongate hole intersects with the second guide shaft rear end supporting part. With this configuration, it is possible to increase a swing amount of the second guide shaft and to widen an adjustable range of the inclination of the optical axis.

In order to achieve the above-mentioned object, a fifth aspect of the present invention provides the lens apparatus according to any one of the first to fourth aspects, in which: the rotating member is rotatably provided to the lens barrel when the rotating shaft is fitted into a bearing hole which is formed so as to pass completely through the lens barrel to an end surface thereof; and a groove into which a leading end of a screwdriver is fitted is formed on an end surface of the rotating shaft.

According to the present invention, the rotating member is rotatably provided to the lens barrel when the rotating shaft is fitted into the bearing hole which is formed so as to pass completely through the lens barrel to the end surface thereof. The groove (for example, a cross slot (+) shape or a straight slot (−) shape) into which the leading end of the screwdriver is fitted is formed on the end surface of the rotating shaft. When the rotating member is to be rotated, the leading end of the screwdriver corresponding to the groove is fitted thereinto, to thereby rotate the rotating member by the screwdriver. With this configuration, it is possible to facilitate fine rotation adjustment.

In order to achieve the above-mentioned object, a sixth aspect of the present invention provides the lens apparatus according to any one of the first to fifth aspects, in which: the second guide shaft rear end supporting part has a communicating hole which is communicated with the end surface of the lens barrel; and the second guide shaft after adjustment is fixed by pouring an adhesive into the communicating hole.

According to the present invention, the communicating hole which is communicated with the second guide shaft rear end supporting part formed as the elongate hole is formed on the end surface of the lens barrel. After the adjustment of the optical axis, the second guide shaft can be fixed to the lens barrel by pouring the adhesive into the communicating hole. With this configuration, it is possible to prevent the optical axis after the adjustment from being shifted.

In order to achieve the above-mentioned object, a seventh aspect of the present invention provides the lens apparatus according to the sixth aspect, in which: the rotating member is rotatably provided to the lens barrel when the rotating shaft is fitted into the bearing hole which is formed so as to pass completely through the lens barrel to the end surface thereof; the swinging member is secured with a screw to a threaded hole which is formed so as to pass completely through the lens barrel to the end surface thereof, and is swingably provided to the lens barrel with the screw serving as the swinging shaft; and the rotating member and the swinging member after adjustment are fixed by pouring the adhesive into the bearing hole and the threaded hole, respectively.

According to the present invention, the rotating member is rotatably provided to the lens barrel when the rotating shaft is fitted into the bearing hole which is formed so as to pass completely through the lens barrel to the end surface thereof. In addition, the swinging member is secured with the screw to the threaded hole which is formed so as to pass completely through the lens barrel to the end surface thereof, and is swingably provided to the lens barrel. After the adjustment of the optical axis, the rotating member and the swinging member can be fixed by pouring the adhesive into the bearing hole and the threaded hole, respectively, so that the second guide shaft can be fixed more firmly.

According to the present invention, it is possible to adjust only the inclination of the optical axis in a desired direction.

DETAILED DESCRIPTION OF THE PREFERRED EMBODIMENTS

Hereinafter, with reference to the attached drawings, an embodiment of a lens apparatus according to the present invention is described.

Figure 1:
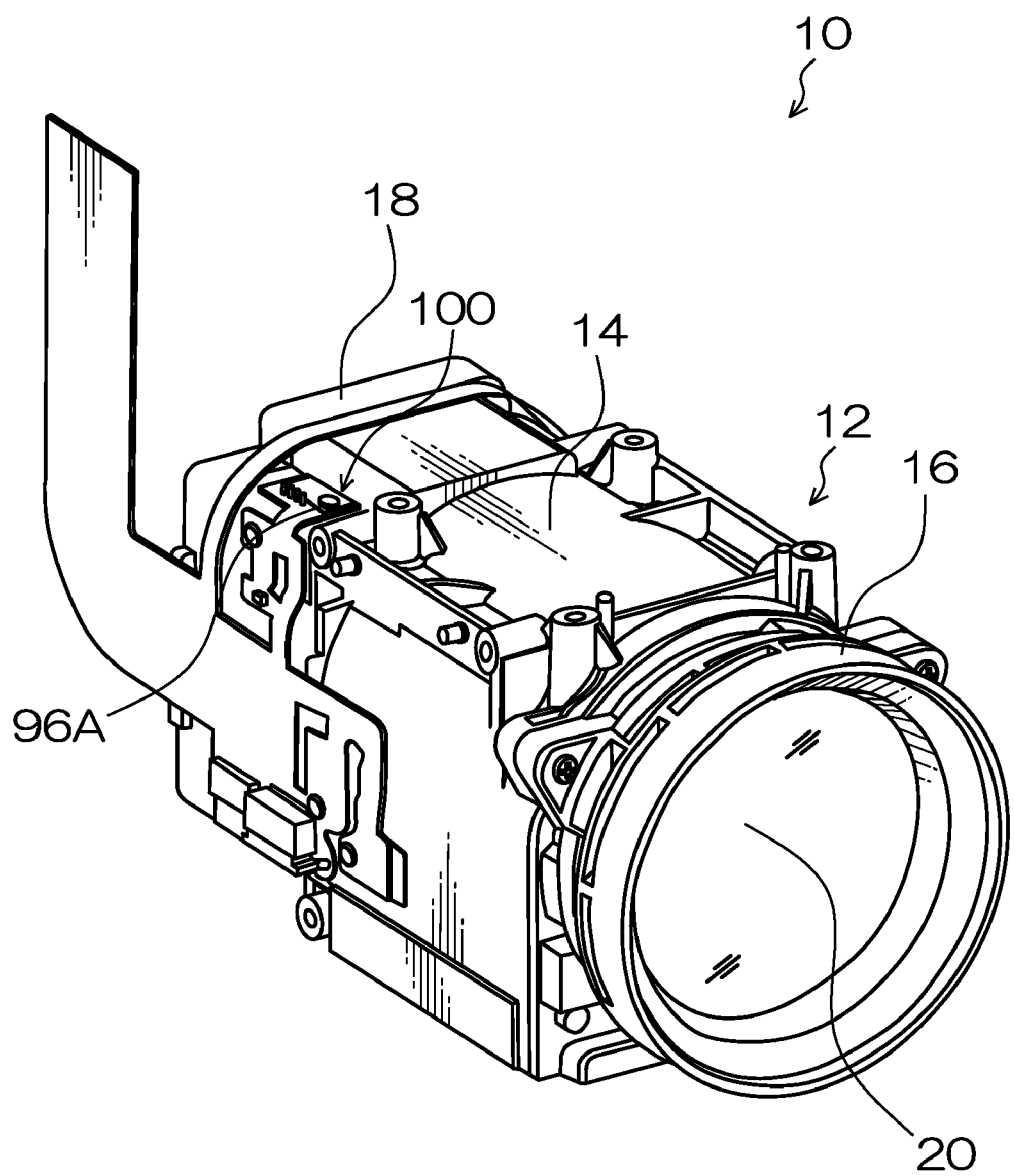
FIG. 1 is a front perspective view illustrating an external appearance configuration of a lens apparatus.
Figure 2:
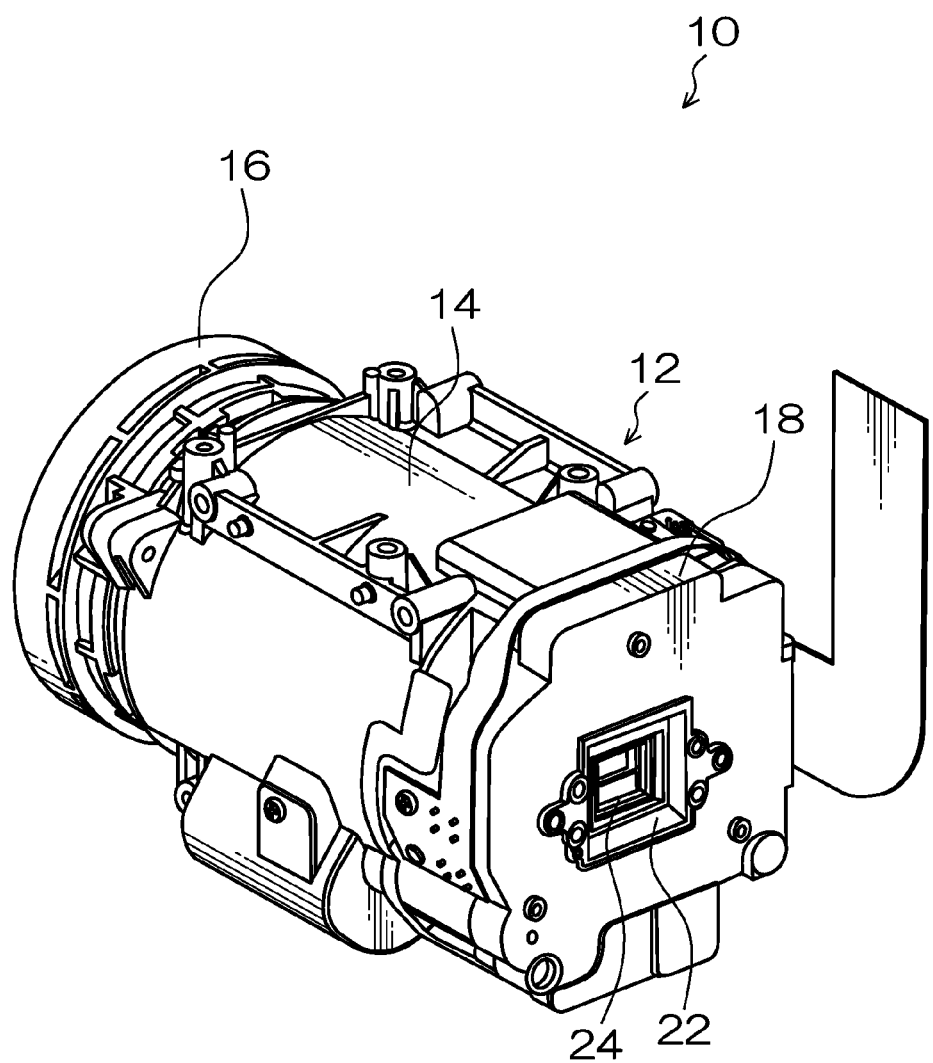
FIG. 2 is a back perspective view illustrating the external appearance configuration of the lens apparatus.

FIGS. 1 and 2 are a front perspective view and a back perspective view illustrating an external appearance configuration of a lens apparatus 10 to which the present invention is applied, respectively.

The lens apparatus 10 is a lens apparatus for a surveillance camera, and includes a lens barrel 12 in which a CCD is integrally incorporated.

The lens barrel 12 includes a lens barrel main body 14, a lens holder 16, and a CCD holder 18.

The lens barrel main body 14 is formed into a cylindrical shape with both ends thereof being opened, and the lens holder 16 which holds an objective lens 20 is secured with screws and coaxially attached to a front end of the lens barrel main body 14. In addition, the CCD holder 18 is secured with screws and attached to a rear end part of the lens barrel main body 14.

The CCD holder 18 is formed into a plate-like shape corresponding to an outer peripheral shape of the rear end part of the lens barrel main body 14. When the CCD holder 18 is attached to the lens barrel main body 14, the opening part at the rear end part thereof is closed by the CCD holder 18. In addition, the CCD holder 18 is attached to the lens barrel main body 14 at an attitude perpendicular to an optical axis.

The CCD (not shown) is mounted on a CCD substrate, and the CCD substrate is secured with screws to the CCD holder 18, whereby the CCD is attached to the CCD holder 18. A concave part 22 having a shape corresponding to an outer peripheral shape of the CCD substrate is formed on a rear end surface of the CCD holder 18. The CCD substrate is fitted into the concave part 22, and the CCD substrate is secured with screws to the CCD holder 18, whereby the CCD is positioned at a predetermined position to be attached to the CCD holder 18.

In addition, an opening part 24 having a rectangular shape corresponding to an outer peripheral shape of the CCD is formed in the concave part 22. When the CCD is attached to the CCD holder 18, the CCD is housed and disposed inside the opening part 24.

It should be noted that the opening part 24 is formed so that upper and lower sides thereof are horizontal and right and left sides thereof are vertical with respect to the CCD holder 18. Further, the CCD is disposed inside the opening part 24 so that upper, lower, right, and left sides thereof are parallel to the upper, lower, right, and left sides of the opening part 24. Accordingly, the CCD is attached to the CCD holder 18 at an attitude at which the upper and lower sides thereof are horizontal with respect to the CCD holder 18.

In addition, the CCD is attached to the CCD holder 18 so that a light receiving surface thereof is orthogonal to the optical axis and that the optical axis is positioned at the center of the light receiving surface.

In addition to the objective lens 20 described above, an iris unit, a focus lens, and the like are housed and disposed in the lens barrel 12. An amount of light which is made incident on the light receiving surface of the CCD is adjusted by an iris included in the iris unit. In addition, focus adjustment of the lens apparatus 10 is performed by moving the focus lens back and forth along the optical axis.

In the lens apparatus 10 of the present embodiment, the focus lens is driven by a voice coil motor (VCM). The focus lens is moved back and forth by the VCM along the optical axis, to thereby perform the focus adjustment of the lens apparatus 10.

Hereinafter, a configuration of a drive unit of the focus lens is described.

Figure 3:
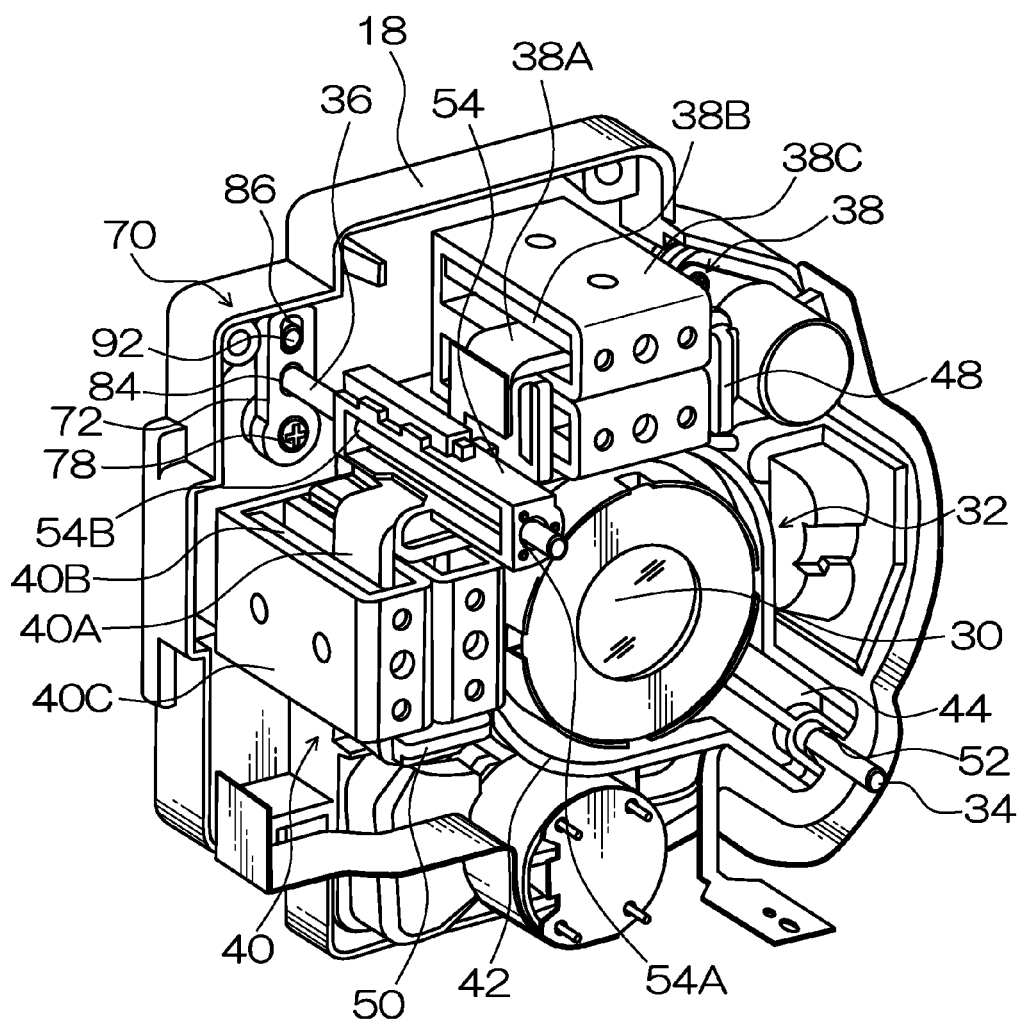
FIG. 3 is a perspective view illustrating a configuration of a drive unit of a focus lens.

FIG. 3 is a perspective view illustrating a configuration of a drive unit of a focus lens 30.

As illustrated in FIG. 3, the focus lens 30 is held by a focus lens frame 32. The focus lens frame 32 is guided and movably supported by two guide shafts (a first guide shaft 34 and a second guide shaft 36) which are provided parallel to the optical axis. The focus lens frame 32 is driven by a pair of VCMs (a first VCM 38 and a second VCM 40) to move back and forth along the optical axis.

Figure 5:
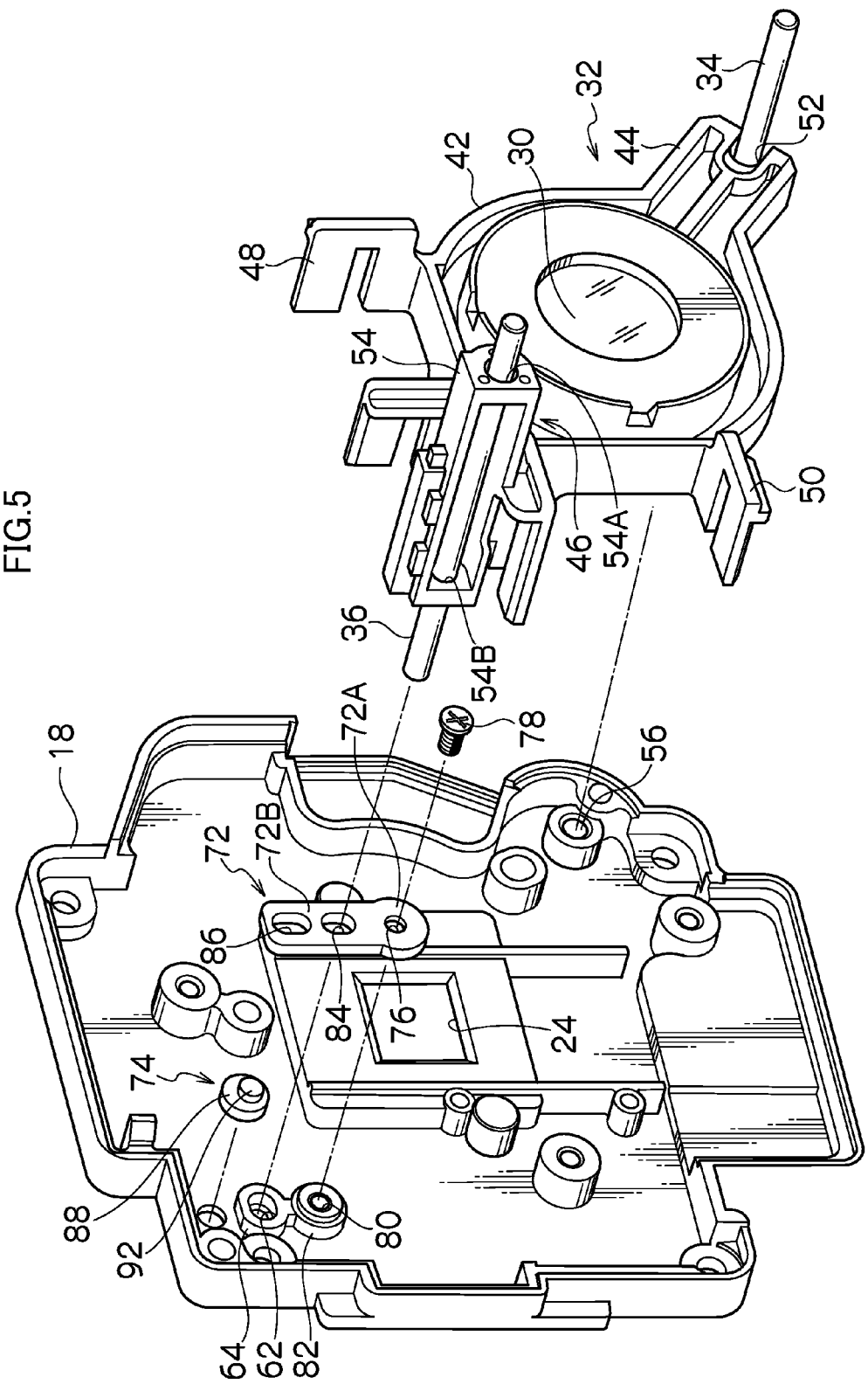
FIG. 5 is an assembly development view illustrating the drive unit of the focus lens.
Figure 6:
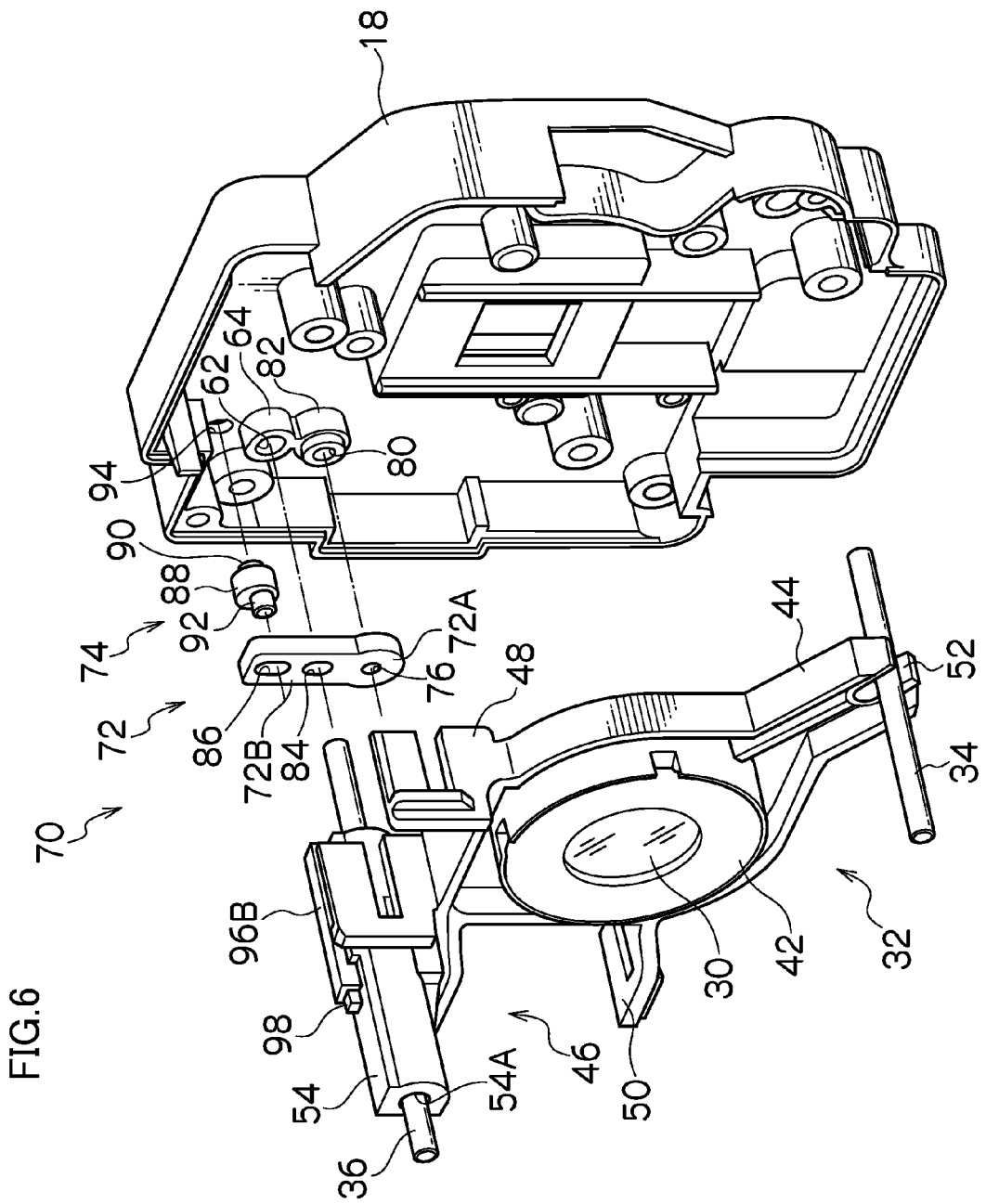
FIG. 6 is another assembly development view illustrating the drive unit of the focus lens.

As illustrated in FIG. 5 and FIG. 6, the focus lens frame 32 includes: a focus lens frame main body 42 which holds the focus lens 30; a first guide part 44 which is formed integrally with the focus lens frame main body 42 and is engaged with the first guide shaft 34; a second guide part 46 which is formed integrally with the focus lens frame main body 42 and is engaged with the second guide shaft 36; a first voice coil holding part 48 which is formed integrally with the focus lens frame main body 42 and holds a voice coil of the first VCM 38; and a second voice coil holding part 50 which is formed integrally with the focus lens frame main body 42 and holds a voice coil of the second VCM 40.

The focus lens frame main body 42 is formed into a cylindrical shape, and the focus lens 30 is held in an inner peripheral part thereof.

The first guide part 44 is located at a lower right position of an outer peripheral part of the focus lens frame main body 42, and is formed as a plate-like protrusion piece so as to protrude outward in a diametrical direction orthogonal to the optical axis. A U-shaped guide groove 52 is formed at a leading end of the first guide part 44, and the first guide shaft 34 is fitted into the guide groove 52. A width of the guide groove 52 is formed correspondingly to an outer diameter of the first guide shaft 34, and an inner peripheral edge part thereof is formed into a circular arc shape. Accordingly, the first guide shaft 34 fitted into the guide groove 52 comes into line contact with the inner peripheral part of the guide groove 52, and guides the first guide part 44 in a shaft length direction.

The second guide part 46 is located at an upper left position of the focus lens frame main body 42 (a diagonal position of the first guide part 44), and is formed so as to protrude outward in the diametrical direction. A guide sleeve 54 is integrally formed at a leading end of the second guide part 46, and the second guide shaft 36 is inserted through the guide sleeve 54. The guide sleeve 54 is provided parallel to the optical axis of the focus lens 30 held by the focus lens frame main body 42, and guide holes 54A and 54B are formed at both end parts thereof. The guide hole 54A and the guide hole 54B are each formed so as to have a diameter corresponding to an outer diameter of the second guide shaft 36, and are disposed coaxially to each other. The second guide shaft 36 is caused to pass through the guide holes 54A and 54B to be inserted through the guide sleeve 54.

The first guide shaft 34 is fitted into the guide groove 52 of the first guide part 44, and the second guide shaft 36 is inserted through the guide sleeve 54 of the second guide part 46, whereby the focus lens frame 32 is supported by the first guide part 44 and the second guide part 46 so as to be movable along the first guide shaft 34 and the second guide shaft 36 which are provided along the optical axis. Then, because the focus lens frame 32 is supported movably along the first guide shaft 34 and the second guide shaft 36, the focus lens frame 32 is supported movably along the optical axis.

The first voice coil holding part 48 is formed in an upper part of the outer peripheral part of the focus lens frame main body 42.

The second voice coil holding part 50 is formed in a right side part of the outer peripheral part of the focus lens frame main body 42.

The first VCM 38 mainly includes a voice coil 38A and a magnet 38B, and the voice coil 38A is attached to the first voice coil holding part 48. The magnet 38B is attached to a yoke 38C, and the yoke 38C is secured with screws and attached to a predetermined position of an inner surface of the CCD holder 18 (a surface which covers the rear end of the lens barrel main body 14). At this time, the magnet 38B is attached to the CCD holder 18 so as to be parallel to the optical axis. With this configuration, the focus lens frame 32 can be driven along the optical axis.

Similarly, the second VCM 40 mainly includes a voice coil 40A and a magnet 40B, and the voice coil 40A is attached to the second voice coil holding part 50. The magnet 40B is attached to a yoke 40C, and the yoke 40C is secured with screws and attached to a predetermined position of the inner surface of the CCD holder 18. At this time, the magnet 40B is attached to the CCD holder 18 so as to be parallel to the optical axis. With this configuration, the focus lens frame 32 can be driven along the optical axis.

Figure 4:
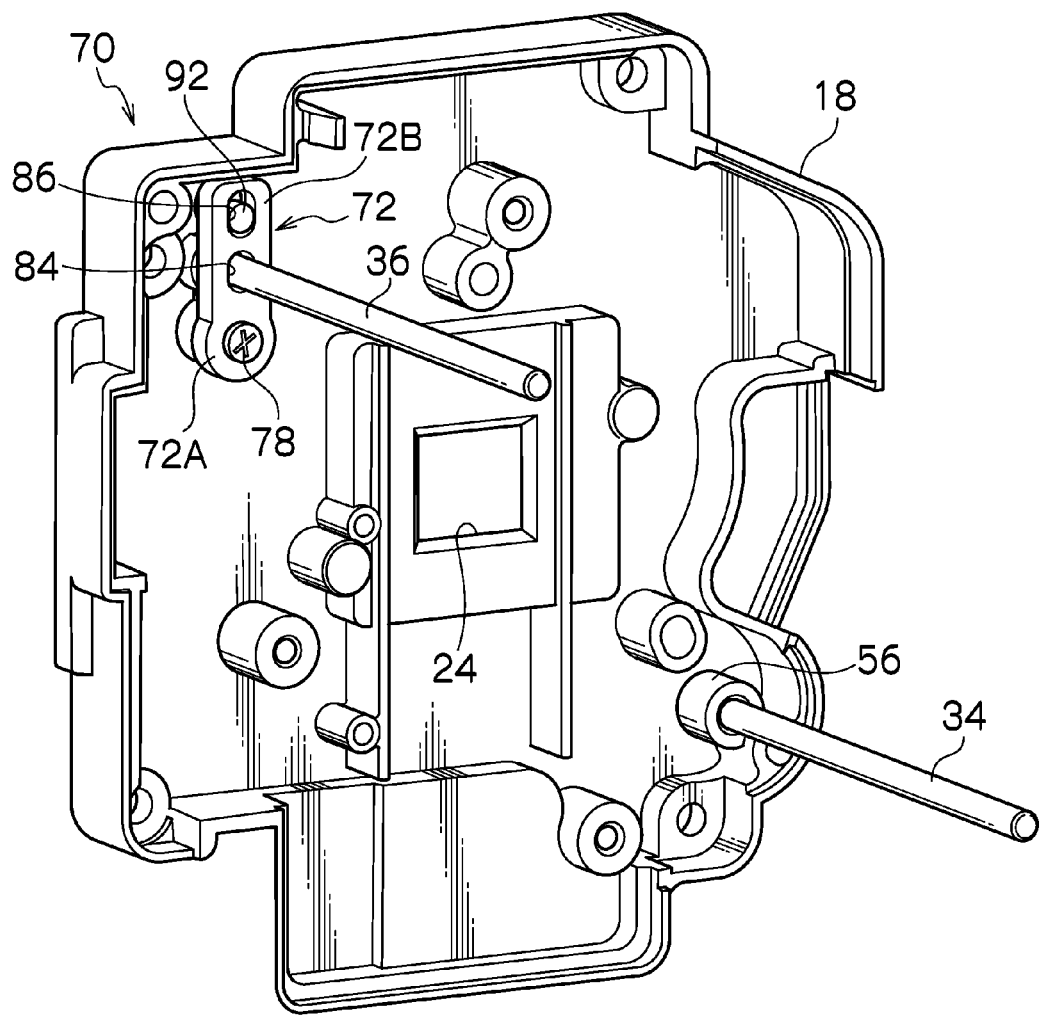
FIG. 4 is a perspective view illustrating an attachment structure of a first guide shaft and a second guide shaft.

The first guide shaft 34 is formed into a columnar shape. As illustrated in FIG. 4, a rear end part of the first guide shaft 34 is fixed to a first guide shaft rear end fixing part 56 which is formed at a predetermined position of the inner surface of the CCD holder 18, and a front end part thereof is fixed to a first guide shaft front end fixing part (not shown) which is formed inside the lens barrel main body 14, so that the first guide shaft 34 is disposed inside the lens barrel main body 14.

The first guide shaft rear end fixing part 56 is formed as a cylindrical protrusion part integrally with the inner surface of the CCD holder 18. The first guide shaft rear end fixing part 56 is provided parallel to the optical axis, and an inner diameter thereof is formed correspondingly to the outer diameter of the first guide shaft 34. The rear end part of the first guide shaft 34 is fitted into the first guide shaft rear end fixing part 56, to be thereby fixedly attached to the CCD holder 18.

The first guide shaft front end fixing part (not shown) is formed inside the lens barrel main body 12 as a hole into which the front end part of the first guide shaft 34 is fitted. This hole is formed parallel to the optical axis. The front end part of the first guide shaft 34 is fitted into the hole of the first guide shaft front end fixing part, to be thereby fixed to the lens barrel main body 14.

As described above, the rear end part of the first guide shaft 34 is fixed to the first guide shaft rear end fixing part 56, and the front end part thereof is fixed to the first guide shaft front end fixing part, whereby the first guide shaft 34 is fixedly attached to the inside of the lens barrel main body 14.

The second guide shaft 36 is formed into a columnar shape. A front end part of the second guide shaft 36 is swingably supported by a second guide shaft front end supporting part 60 which is formed inside the lens barrel main body 14, and a rear end part thereof is supported movably in a horizontal direction by a second guide shaft rear end supporting part 62 which is formed at a predetermined position of the inner surface of the CCD holder 18, so that the second guide shaft 36 is disposed inside the lens barrel main body 14.

Figure 7:
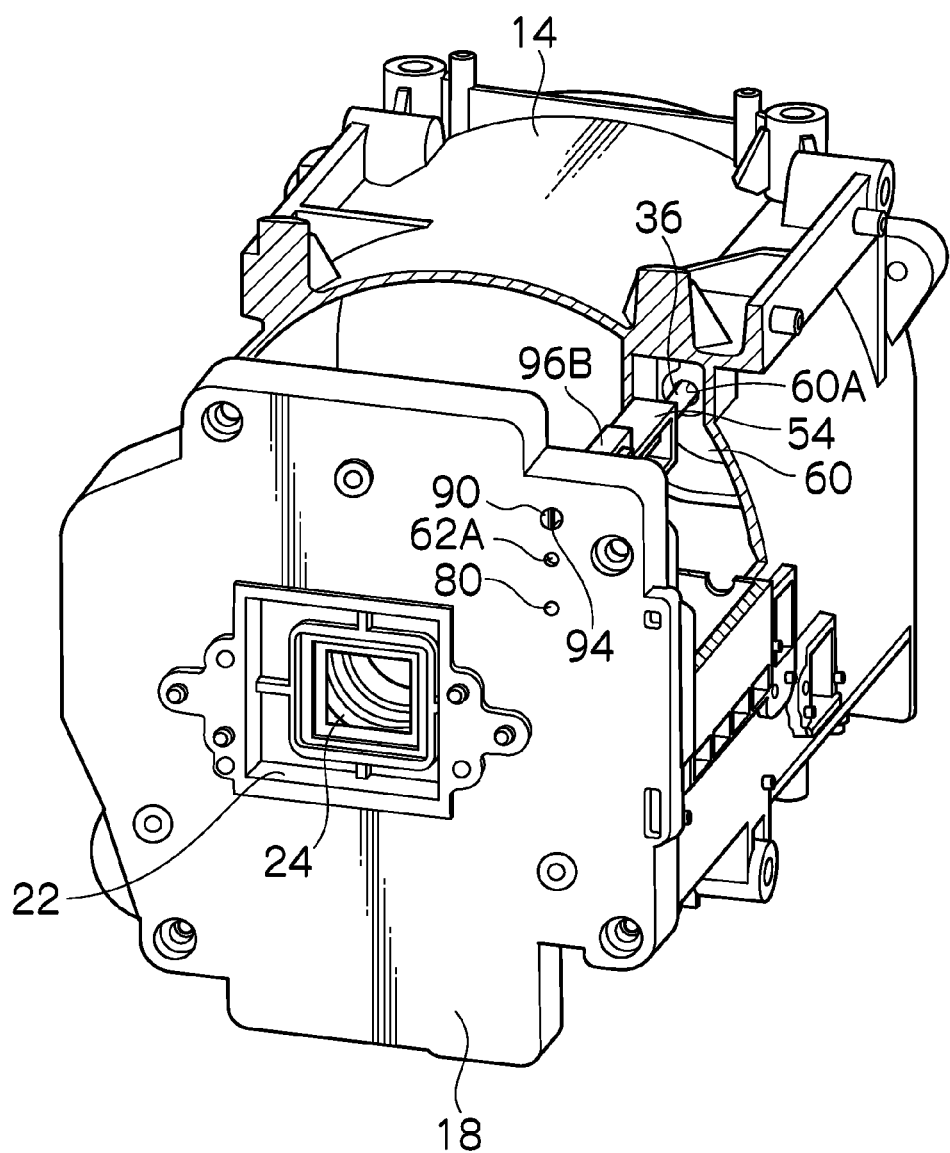
FIG. 7 is a partially opened-up view illustrating a lens barrel.

As illustrated in FIG. 7, the second guide shaft front end supporting part 60 is formed as a thin plate-like protrusion piece so as to protrude inward within the lens barrel main body 14. The second guide shaft front end supporting part 60 is formed orthogonally to the optical axis, and a second guide shaft supporting hole 60A is formed at a predetermined position thereof. The second guide shaft supporting hole 60A is formed correspondingly to the outer diameter of the second guide shaft 36, and is formed parallel to the optical axis. The front end part of the second guide shaft 36 is fitted into the second guide shaft supporting hole 60A, to be thereby supported by the lens barrel main body 14.

Figure 8:
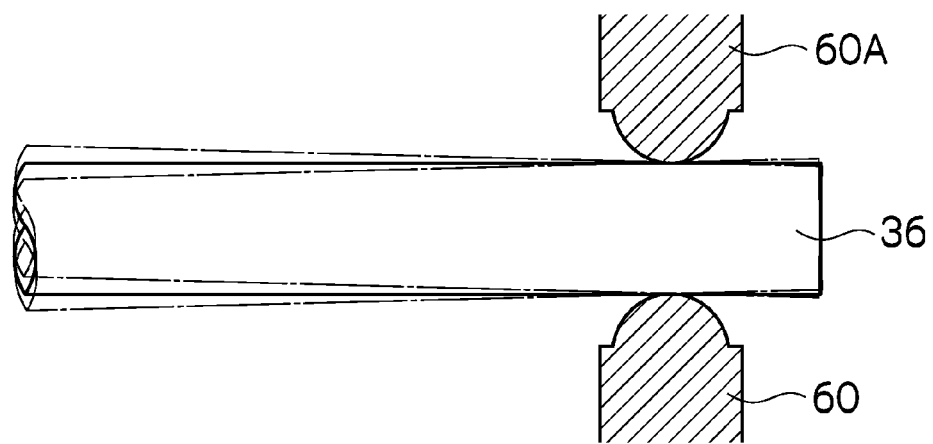
FIG. 8 is a cross sectional plan view illustrating a configuration of a second guide shaft front end supporting part.

Here, as illustrated in FIG. 8, an inner peripheral edge part of the second guide shaft supporting hole 60A is formed into a circular arc shape. Accordingly, the second guide shaft 36 fitted into the second guide shaft supporting hole 60A is supported in the state where an outer periphery thereof is in line contact with the inner peripheral part of the second guide shaft supporting hole 60A. With this configuration, the second guide shaft 36 is supported swingably with respect to the second guide shaft front end supporting part 60 with a fitting point thereof being as a fulcrum.

Figure 9:
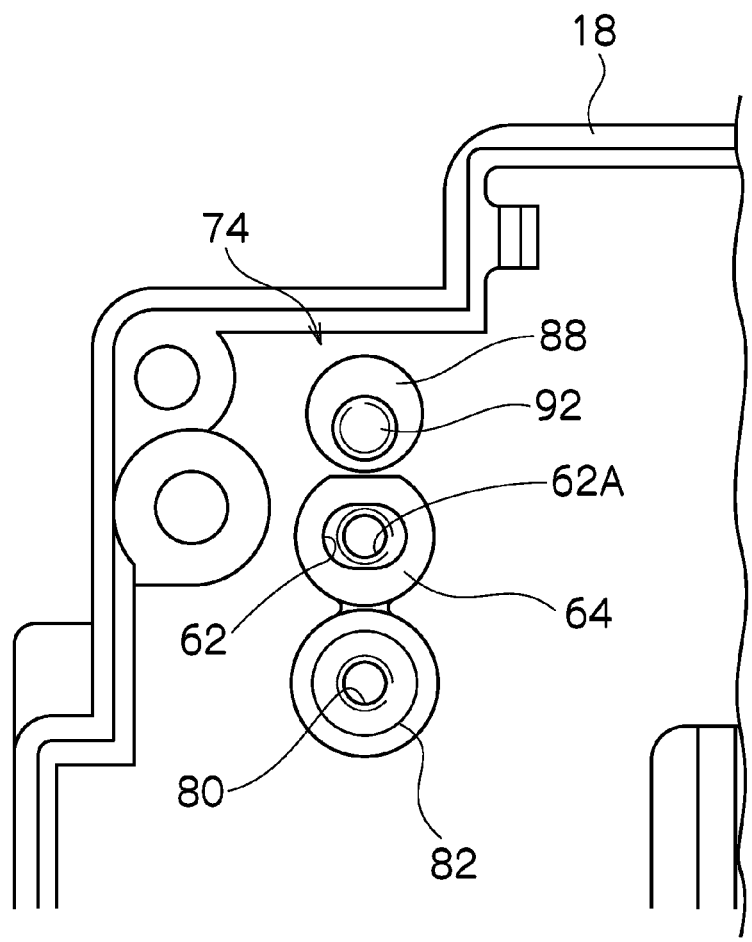
FIG. 9 is a front view illustrating an enlarged main part of an inner surface of a CCD holder.

The second guide shaft rear end supporting part 62 is formed on the inner surface of the CCD holder 18 as a horizontal elongate hole (which is parallel to the upper and lower sides of the CCD incorporated in the lens barrel 12) (see FIG. 9). The second guide shaft rear end supporting part 62 is formed at a predetermined depth along the optical axis on an end surface of a columnar protrusion part 64 which is formed integrally with the inner surface of the CCD holder 18. In addition, a width (a width in a vertical direction) thereof is formed correspondingly to an outer diameter of the second guide shaft rear end supporting part 62. In addition, a communicating hole 62A which is communicated with the rear end surface of the CCD holder 18 is formed at the center of a bottom part thereof. The rear end part of the second guide shaft 36 is fitted into and supported by the second guide shaft rear end supporting part 62.

Here, because the second guide shaft rear end supporting part 62 is formed as the horizontal elongate hole, the rear end part of the second guide shaft 36 is supported movably only in the horizontal direction. As described above, the front end part of the second guide shaft 36 is swingably supported by the second guide shaft front end supporting part 60. Therefore, the second guide shaft 36 having both the end parts supported by the second guide shaft front end supporting part 60 and the second guide shaft rear end supporting part 62 is supported swingably within a horizontal plane (within a plane which is parallel to the upper and lower sides of the CCD incorporated in the CCD holder 18 and also parallel to the optical axis) with a fitting point thereof into the second guide shaft front end supporting part 60 being as a fulcrum.

The focus lens frame 32 which is supported by the first guide shaft 34 and the second guide shaft 36 can swing the optical axis in the horizontal direction by swinging the second guide shaft 36 within the horizontal plane. Accordingly, the horizontal inclination of the optical axis can be adjusted by adjusting the horizontal inclination of the second guide shaft 36. The horizontal inclination of the second guide shaft 36 is adjusted by moving the rear end part of the second guide shaft 36 in the horizontal direction by means of a second guide shaft swinging mechanism 70.

Figure 10:
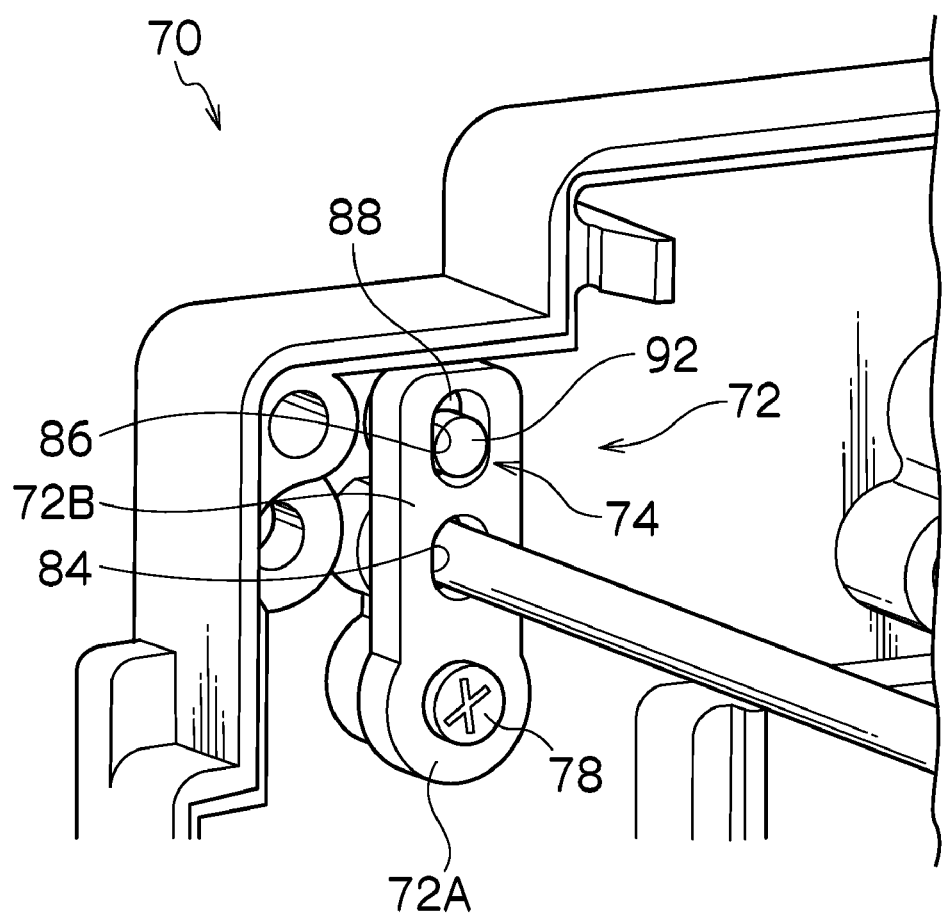
FIG. 10 is a perspective view illustrating a configuration of a second guide shaft swinging mechanism.
Figure 11:
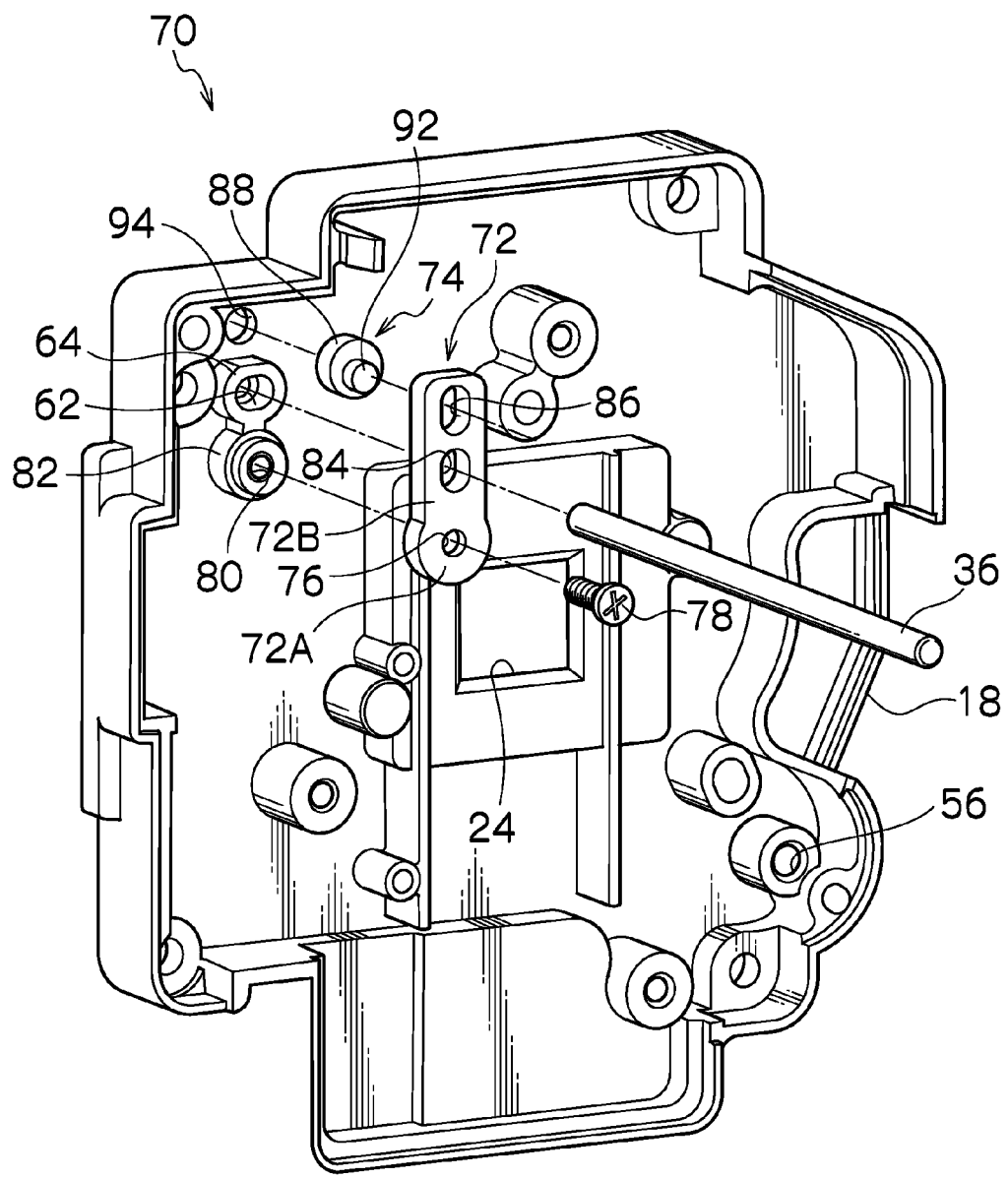
FIG. 11 is an assembly development view illustrating the second guide shaft swinging mechanism.

FIG. 10 is a perspective view illustrating a configuration of the second guide shaft swinging mechanism 70. FIG. 11 is an assembly development view illustrating the second guide shaft swinging mechanism 70.

As illustrated in FIG. 10 and FIG. 11, the second guide shaft swinging mechanism 70 includes a swinging frame 72 and a rotating piece 74.

The swinging frame 72 is formed into a rectangular plate-like shape, and includes a shaft part 72A which is formed into a disk-like shape and a rectangular swinging part 72B which extends from the shaft part 72A in a diametrical direction.

A swinging shaft hole 76 is formed at the center of the shaft part 72A so as to pass completely therethrough. The swinging frame 72 is screwed to the inner surface of the CCD holder 18 by inserting a swinging frame supporting bolt 78 into the swinging shaft hole 76. A threaded hole 80 to be screwed with the swinging frame supporting bolt 78 is formed on the inner surface of the CCD holder 18. The threaded hole 80 is formed at a position immediately below the second guide shaft rear end supporting part 62, and is formed in a columnar protrusion part 82 which is formed on the inner surface of the CCD holder 18 so as to protrude therefrom. In addition, the threaded hole 80 is formed parallel to the optical axis, and is formed so as to pass completely through the CCD holder 18 to the rear end surface thereof. When the swinging frame supporting bolt 78 is screwed with the threaded hole 80 and the swinging frame 72 is attached to the inner surface of the CCD holder 18, the swinging frame 72 is supported swingably around the swinging frame supporting bolt 78 with the swinging frame supporting bolt 78 serving as a swinging shaft.

A first elongate hole 84 and a second elongate hole 86 are formed in the swinging part 72B of the swinging frame 72 along a longitudinal direction of the swinging part 72B. The first elongate hole 84 and the second elongate hole 86 are formed on the same straight line so as to be longitudinally arranged, and the swinging shaft hole 76 is formed on an extended line therefrom. That is, the swinging shaft hole 76, the first elongate hole 84, and the second elongate hole 86 are formed in the swinging frame 72 so as to be arranged on the same straight line in order of the swinging shaft hole 76, the first elongate hole 84, and the second elongate hole 86.

A width (a width in a direction orthogonal to the longitudinal direction) of the first elongate hole 84 is formed correspondingly to the outer diameter of the second guide shaft 36. In addition, when the swinging frame 72 is attached to the CCD holder 18 by the swinging frame supporting bolt 78, the first elongate hole 84 is disposed at a position at which the first elongate hole 84 intersects with the second guide shaft rear end supporting part 62 formed in the CCD holder 18. Specifically, the first elongate hole 84 is formed at a position at which a distance between the center of the threaded hole 80 and the center of the second guide shaft rear end supporting part 62 becomes equal to a distance between the center of the second guide shaft supporting hole 60A and the center of the first elongate hole 84. With this configuration, when the swinging frame 72 is attached to the CCD holder 18, the first elongate hole 84 and the second guide shaft rear end supporting part 62 intersect with each other. The second guide shaft 36 is inserted through the first elongate hole 84, and the rear end part thereof is fitted into the second guide shaft rear end supporting part 62. As a result, when the swinging frame 72 is swung, the second guide shaft 36 horizontally moves. That is, when the swinging frame 72 is swung, the first elongate hole 84 provided in the swinging frame 72 pushes the second guide shaft 36, so that the second guide shaft 36 is also swung. The vertical movement of the second guide shaft 36 is restricted by the second guide shaft rear end supporting part 62, and hence the second guide shaft 36 moves only in the horizontal direction.

The rotating piece 74 includes a rotating piece main body 88 which is formed into a disk-like shape, a rotating shaft 90 which is coaxially provided on a rear surface of the rotating piece main body 88, and an eccentric pin 92 which is eccentrically provided on a front surface of the rotating piece main body 88.

The rotating piece main body 88 is formed into a disk-like shape, and a thickness thereof in the shaft length direction is formed to be substantially the same as a space which is formed between a rear surface of the swinging frame 72 and the inner surface of the CCD holder 18 when the swinging frame 72 is attached to the CCD holder 18 (substantially the same as a height of the protrusion part 82).

The rotating shaft 90 is formed into a columnar shape, and is formed parallel to an axis of the rotating piece main body 88. The rotating shaft 90 is fitted into a bearing hole 94 which is formed on the inner surface of the CCD holder 18.

The bearing hole 94 is formed correspondingly to an outer diameter of the rotating shaft 90, and is formed at a position immediately above the second guide shaft rear end supporting part 62. In addition, the bearing hole 94 is formed parallel to the optical axis, and is formed so as to pass completely through the CCD holder 18 to the rear end surface thereof.

When the rotating shaft 90 is fitted into the bearing hole 94, the rotating piece 74 is attached to the inner surface of the CCD holder 18, and is supported rotatably with respect to the rotating shaft 90.

Figure 12:
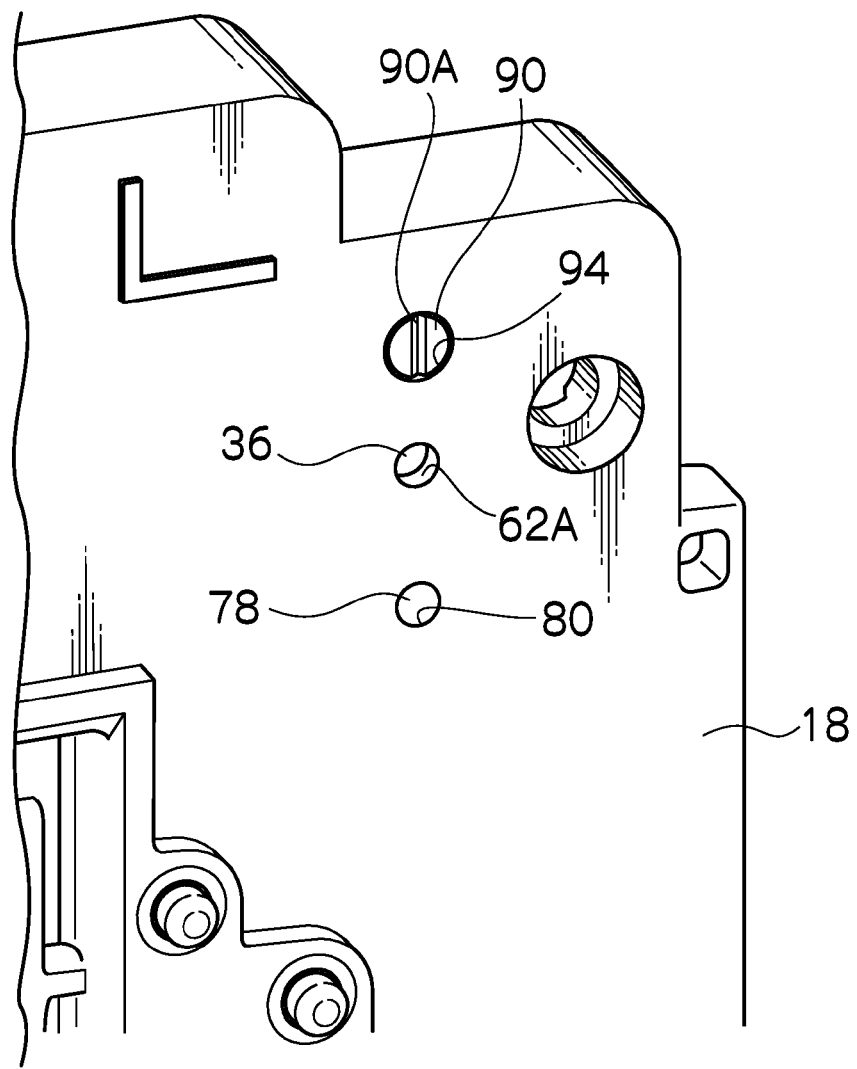
FIG. 12 is a perspective view illustrating an enlarged main part of a rear end surface of the CCD holder.

As illustrated in FIG. 12, when the rotating shaft 90 is fitted into the bearing hole 94, an end surface thereof is exposed on the rear end surface of the CCD holder 18. A groove 90A having a straight slot (−) shape is formed on the end surface of the rotating shaft 90. Accordingly, a leading end of a flat-blade screwdriver is engaged with the groove 90A, whereby the rotating shaft 90 can be rotated on the rear end surface side of the CCD holder 18.

The eccentric pin 92 is formed into a columnar shape, and is formed parallel to the axis of the rotating piece main body 88. In addition, the eccentric pin 92 is formed so as to be positioned eccentrically with respect to the center (rotation center) of the rotating piece main body 88.

The eccentric pin 92 is fitted into the second elongate hole 86 formed in the swinging frame 72. Therefore, a width (a width in the direction orthogonal to the longitudinal direction) of the second elongate hole 86 is formed correspondingly to an outer diameter of the eccentric pin 92.

As described above, when the rotating shaft 90 is fitted into the bearing hole 94 formed in the CCD holder 18 and the eccentric pin 92 is fitted into the second elongate hole 86 formed in the swinging frame 72, the rotating piece 74 is attached to the inner surface of the CCD holder 18.

It should be noted that, as described above, the thickness of the rotating piece main body 88 in the shaft length direction is formed to be the same as the space which is formed between the inner surface of the CCD holder 18 and the rear surface of the swinging frame 72, and hence when the rotating shaft 90 is fitted into the bearing hole 94 and the eccentric pin 92 is fitted into the second elongate hole 86 in the above-mentioned manner, the rotating piece main body 88 is housed between the inner surface of the CCD holder 18 and the rear surface of the swinging frame 72. As a result, the rotating piece 74 is rotatably attached to the inner surface of the CCD holder 18 without being unstable.

The second guide shaft swinging mechanism 70 is configured as described above. In the second guide shaft swinging mechanism 70, when the rotating shaft 90 of the rotating piece 74 which is exposed on the rear end surface of the CCD holder 18 is rotated by the flat-blade screwdriver, the second guide shaft 36 is swung within the horizontal plane. That is, when the rotating shaft 90 of the rotating piece 74 is rotated, the eccentric pin 92 is rotated eccentrically with respect to the rotating shaft 90, with the result that the swinging frame 72 is swung with respect to the swinging frame supporting bolt 78. Then, when the swinging frame 72 is swung, the second guide shaft 36 inserted through the first elongate hole 84 of the swinging frame 72 is horizontally swung with the second guide shaft front end supporting part 60 being as a fulcrum.

When the second guide shaft 36 is swung in the horizontal direction, the focus lens frame 32 supported by the first guide shaft 34 and the second guide shaft 36 is swung in the horizontal direction so as to interlock with the second guide shaft 36. This makes it possible to adjust the horizontal inclination of the optical axis.

As described above, the focus lens frame 32 is driven and moved by the first VCM 38 and the second VCM 40. Such a move of the focus lens frame 32 (the move of the focus lens 30) is detected by an MR sensor 96. The MR sensor 96 includes an MR sensor main body 96A and a detection magnet 96B, and the MR sensor main body 96A is attached to the lens barrel main body 14. On the other hand, the detection magnet 96B is attached to the focus lens frame 32.

Figure 13:
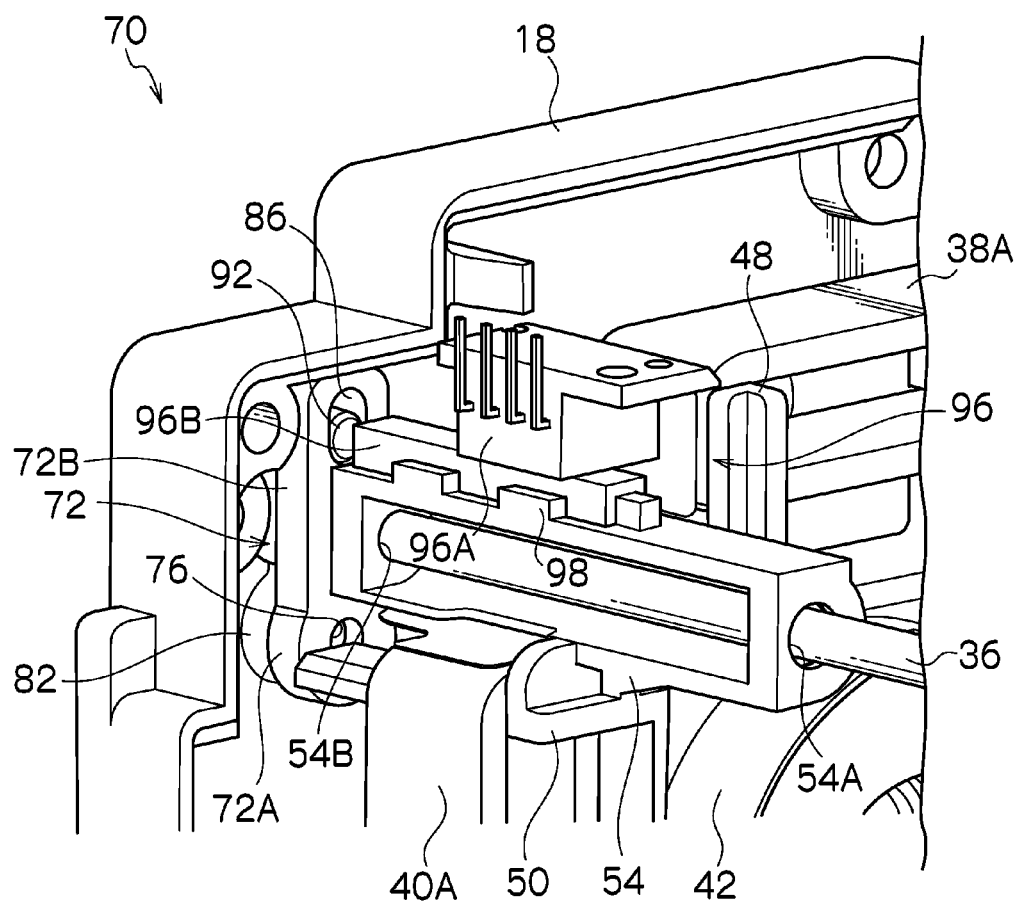
FIG. 13 is a perspective view illustrating a configuration of a placement part of an MR sensor.

As illustrated in FIG. 13, the detection magnet 96B is formed into a rectangular rod-like shape which is long in the shaft length direction, and is attached to an upper part of the guide sleeve 54 formed in the focus lens frame 32. A detection magnet attachment part 98 for attaching the detection magnet 96B is provided in the upper part of the guide sleeve 54. The detection magnet 96B is bonded to be attached to the detection magnet attachment part 98. The detection magnet 96B to be attached to the detection magnet attachment part 98 is attached to the detection magnet attachment part 98 so as to be parallel to the optical axis and have an upper surface which is horizontal.

As illustrated in FIG. 1, the MR sensor main body 96A is attached to an MR sensor main body attachment part 100 formed in an upper part of the lens barrel main body 14. The MR sensor main body attachment part 100 has a sensor fitting hole (not shown) which is communicated with the inside of the lens barrel main body 14, and the MR sensor main body 96A is fitted into the sensor fitting hole to be attached to the MR sensor main body attachment part 100. As illustrated in FIG. 13, a detection surface of the MR sensor main body 96A attached to the MR sensor main body attachment part 100 is opposed to an upper surface of the detection magnet 96B attached to the focus lens frame 32 with a predetermined gap.

In the MR sensor 96 attached as described above, when the focus lens frame 32 is moved along the optical axis, the detection magnet 96B is accordingly moved along the optical axis. Such a move of the detection magnet 96B is detected by the MR sensor main body 96A, so that a position of the focus lens frame 32 is detected.

If a placement interval (air gap) between the MR sensor main body 96A and the detection magnet 96B is shifted, the MR sensor 96 becomes incapable of accurate detection. In the lens apparatus 10 of the present embodiment, the detection magnet 96B is attached to the focus lens frame 32, and hence when the focus lens frame 32 is swung for adjusting the optical axis, the position of the detection magnet 96B is also changed. However, in the lens apparatus 10 of the present embodiment, the focus lens frame 32 is swung only in the horizontal direction, and hence even when the optical axis is adjusted, the interval of the air gap between the MR sensor main body 96A and the detection magnet 96B does not change.

Next, a method of adjusting the optical axis in the lens apparatus 10 of the present embodiment is described.

As described above, the optical axis of the focus lens 30 is adjusted by horizontally swinging the second guide shaft 36. Further, the second guide shaft 36 is swung by rotating the rotating piece 74.

As illustrated in FIG. 12, the end surface of the rotating shaft 90 of the rotating piece 74 is exposed on the rear end surface of the CCD holder 18. Further, the straight slot-shaped groove 90A is formed on the end surface of the rotating shaft 90. An operator fits a leading end of a flat-blade screwdriver into the straight slot-shaped groove 90A formed on the end surface of the rotating shaft 90, and rotates the rotating shaft 90 by the flat-blade screwdriver.

When the rotating shaft 90 is rotated, the rotating piece main body 88 is rotated with respect to the rotating shaft 90. As a result, the eccentric pin 92 is rotated eccentrically with respect to the rotation center of the rotating piece main body 88. The eccentric pin 92 is fitted into the second elongate hole 86 formed in the swinging frame 72, and hence when the eccentric pin 92 is eccentrically rotated, an inner wall surface of the second elongate hole 86 is pushed by the eccentric pin 92, so that the swinging frame 72 is swung with respect to the swinging frame supporting bolt 78.

The second guide shaft 36 is inserted through the first elongate hole 84 of the swinging frame 72, and hence when the swinging frame 72 is swung, an inner wall surface of the first elongate hole 84 pushes the second guide shaft 36, so that the second guide shaft 36 is also swung.

Here, the rear end part of the second guide shaft 36 is fitted into the second guide shaft rear end supporting part 62 formed as the horizontal elongate hole, and the move of the second guide shaft 36 is restricted only to the horizontal direction. Therefore, when the swinging frame 72 is swung, the second guide shaft 36 is swung only in the horizontal direction.

When the second guide shaft 36 is swung, the focus lens frame 32 which is supported by the second guide shaft 36 via the second guide part 46 is swung in the horizontal direction so as to interlock with the swinging of the second guide shaft 36. This makes it possible to adjust the horizontal inclination of the optical axis of the focus lens 30.

As described above, in the lens apparatus 10 of the present embodiment, the rotating shaft 90 which is provided so as to be exposed on the rear end surface of the CCD holder 18 is rotated by a flat-blade screwdriver, whereby the second guide shaft 36 is swung to adjust the inclination of the optical axis.

It should be noted that the inclination of the optical axis is detected by, for example, a laser autocollimator. Then, the rotating shaft 90 is rotated on the basis of the detection result, to thereby adjust the inclination of the optical axis.

When the adjustment of the inclination of the optical axis is completed, an operator fixes the second guide shaft 36. The second guide shaft 36 is fixed by pouring an adhesive into the second guide shaft rear end supporting part 62 through the communicating hole 62A formed on the rear end surface of the CCD holder 18 and thus bonding the rear end part of the second guide shaft 36 to the second guide shaft rear end supporting part 62.

For fixing more firmly, an adhesive is poured into the bearing hole 94 which is provided so as to pass completely through the CCD holder 18 to the rear end surface thereof, whereby the rotating shaft 90 of the rotating piece 74 is bonded and fixed to the bearing hole 94. Moreover, an adhesive is poured into the threaded hole 80, whereby the swinging frame supporting bolt 78 is bonded and fixed to the threaded hole 80.

As has been described hereinabove, in the lens apparatus 10 of the present embodiment, the inclination of the optical axis can be adjusted by swinging the focus lens frame 32 only in the horizontal direction.

In this case, the adjustment is performed only in the horizontal direction. However, because the lens apparatus 10 of the present embodiment is a lens apparatus for photographing with a horizontally long CCD having an aspect ratio of 16:9, even if a vertical inclination of the optical axis slightly occurs, an influence on the quality of a video picture to be photographed is small. Accordingly, even the adjustment performed only in the horizontal direction is sufficient, and the adoption of such a configuration that the adjustment is performed only in the horizontal direction makes it possible to simplify the configuration and facilitate the adjustment work.

In addition, the focus lens frame 32 is swung only in the horizontal direction as described above, to thereby adjust the inclination of the optical axis, which makes it possible to adjust the optical axis without changing the placement interval (air gap) between the MR sensor main body 96A and the detection magnet 96B which are placed by positioning.

Another Embodiment

It should be noted that, in the above-mentioned embodiment, description is given by taking as an example the case where the present invention is applied to a support structure of the focus lens, but the present invention is not limitatively applied thereto. The present invention can be similarly applied to any lens such as a zoom lens as long as the lens is movably supported by a pair of guide shafts (in particular, the lens is driven by a linear actuator).

In addition, in the above-mentioned embodiment, description is given by taking as an example the case where the focus lens frame 32 is swung only in the horizontal direction, to thereby adjust the inclination of the optical axis. Alternatively, it is possible to swing the focus lens frame 32 only in the vertical direction, to thereby adjust the inclination of the optical axis. In this case, the MR sensor main body 96A and the detection magnet 96B are vertically placed (are placed so that the detection surface is vertical). That is, the swing direction of the second guide shaft 36 is set in accordance with the placement direction of the MR sensor main body 96A and the detection magnet 96B (the position of the detection surface). In the case where the placement direction of the MR sensor main body 96A and the detection magnet 96B is horizontal, the second guide shaft 36 is set so as to swing in the horizontal direction. In the case where the placement direction of the MR sensor main body 96A and the detection magnet 96B is vertical, the second guide shaft 36 is set so as to swing in the vertical direction. With this configuration, even when the inclination of the optical axis is adjusted, it is possible to always keep constant the air gap between the MR sensor main body 96A and the detection magnet 96B.

It should be noted that, in the case of using a horizontally long image pickup element, it is preferable to horizontally place the MR sensor main body 96A and the detection magnet 96B and to swing the second guide shaft 36 only in the horizontal direction as described in the above-mentioned embodiment.

What is claimed is:

1. A lens apparatus, comprising:
a lens barrel;
a first guide shaft which is provided parallel to an optical axis in the lens barrel;
a second guide shaft which is provided parallel to the optical axis in the lens barrel;
a first guide shaft front end fixing part which is provided to the lens barrel and to which a front end of the first guide shaft is fixed;
a first guide shaft rear end fixing part which is provided to the lens barrel and to which a rear end of the first guide shaft is fixed;
a second guide shaft front end supporting part which is provided to the lens barrel and swingably supports a front end of the second guide shaft;
a second guide shaft rear end supporting part which is provided to the lens barrel as one of a horizontal elongate hole and a vertical elongate hole and into which a rear end of the second guide shaft is fitted to be supported movably only in one of a horizontal direction and a vertical direction;
a lens frame which holds a lens;
a first guide part which is provided to the lens frame and is engaged with the first guide shaft to thereby guide a move of the lens frame;
a second guide part which is provided to the lens frame and is engaged with the second guide shaft to thereby guide the move of the lens frame;
a swinging member which is provided to the lens barrel swingably with respect to a swinging shaft which is parallel to the optical axis;
a first elongate hole which is formed in the swinging member and through which the second guide shaft is inserted;

a rotating member which is provided to the lens barrel rotatably with respect to a rotating shaft which is parallel to the optical axis;
an eccentric pin which is provided to the rotating member parallel to the optical axis and is provided eccentrically with respect to the rotating shaft;
a second elongate hole which is formed in the swinging member and through which the eccentric pin is inserted; and
a linear actuator which moves the lens frame, wherein
the second guide shaft is swung one of horizontally and vertically by rotating the rotating member, to thereby enable adjusting one of horizontal inclination and vertical inclination of the optical axis of the lens.

2. The lens apparatus according to claim 1, further comprising an MR sensor which is provided to the lens barrel and detects a position of the lens, wherein
the MR sensor includes:
an MR sensor main body which is attached to the lens barrel so as to be parallel to the second guide shaft rear end supporting part; and
a position detection magnet which is attached to the second guide part so as to be opposed to the MR sensor main body.

3. The lens apparatus according to claim 1, further comprising an image pickup element which is horizontally attached to a rear end part of the lens barrel and has an aspect ratio of 16:9, wherein
the second guide shaft rear end supporting part is provided to the lens barrel as the horizontal elongate hole and supports the rear end of the second guide shaft movably only in the horizontal direction.

4. The lens apparatus according to claim 2, further comprising an image pickup element which is horizontally attached to a rear end part of the lens barrel and has an aspect ratio of 16:9, wherein
the second guide shaft rear end supporting part is provided to the lens barrel as the horizontal elongate hole and supports the rear end of the second guide shaft movably only in the horizontal direction.

5. The lens apparatus according to claim 1, wherein:
the swinging shaft, the first elongate hole, and the second elongate hole are located on the same straight line in the swinging member, and the first elongate hole is located between the swinging shaft and the second elongate hole; and
the swinging member is attached to the lens barrel so that the second elongate hole intersects with the second guide shaft rear end supporting part.

6. The lens apparatus according to claim 4, wherein:
the swinging shaft, the first elongate hole, and the second elongate hole are located on the same straight line in the swinging member, and the first elongate hole is located between the swinging shaft and the second elongate hole; and
the swinging member is attached to the lens barrel so that the second elongate hole intersects with the second guide shaft rear end supporting part.

7. The lens apparatus according to claim 1, wherein:
the rotating member is rotatably provided to the lens barrel when the rotating shaft is fitted into a bearing hole which is formed so as to pass completely through the lens barrel to an end surface thereof; and
a groove into which a leading end of a screwdriver is fitted is formed on an end surface of the rotating shaft.

8. The lens apparatus according to claim 6, wherein:
the rotating member is rotatably provided to the lens barrel when the rotating shaft is fitted into a bearing hole which is formed so as to pass completely through the lens barrel to an end surface thereof; and
a groove into which a leading end of a screwdriver is fitted is formed on an end surface of the rotating shaft.

9. The lens apparatus according to claim 1, wherein:
the second guide shaft rear end supporting part has a communicating hole which is communicated with the end surface of the lens barrel; and
the second guide shaft after adjustment is fixed by pouring an adhesive into the communicating hole.

10. The lens apparatus according to claim 8, wherein:
the second guide shaft rear end supporting part has a communicating hole which is communicated with the end surface of the lens barrel; and
the second guide shaft after adjustment is fixed by pouring an adhesive into the communicating hole.

11. The lens apparatus according to claim 9, wherein:
the rotating member is rotatably provided to the lens barrel when the rotating shaft is fitted into the bearing hole which is formed so as to pass completely through the lens barrel to the end surface thereof;
the swinging member is secured with a screw to a threaded hole which is formed so as to pass completely through the lens barrel to the end surface thereof, and is swingably provided to the lens barrel with the screw serving as the swinging shaft; and
the rotating member and the swinging member after adjustment are fixed by pouring the adhesive into the bearing hole and the threaded hole, respectively.

12. The lens apparatus according to claim 10, wherein:
the swinging member is secured with a screw to a threaded hole which is formed so as to pass completely through the lens barrel to the end surface thereof, and is swingably provided to the lens barrel with the screw serving as the swinging shaft; and
the rotating member and the swinging member after adjustment are fixed by pouring the adhesive into the bearing hole and the threaded hole, respectively.

* * * * *